United States Patent
Koziarz et al.

(10) Patent No.: US 11,205,242 B2
(45) Date of Patent: Dec. 21, 2021

(54) MEMORY ERROR RECOVERY FOR COMPLEX PAGE RIP

(71) Applicant: CANON KABUSHIKI KAISHA, Tokyo (JP)

(72) Inventors: Krzysztof Adam Koziarz, Denistone (AU); Sergey Derevyanko, Paddington (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/280,618

(22) Filed: Feb. 20, 2019

(65) Prior Publication Data

US 2019/0266697 A1  Aug. 29, 2019

(30) Foreign Application Priority Data

Feb. 23, 2018 (AU) ................ 2018201347

(51) Int. Cl.

| | | |
|---|---|---|
| *G06F 9/48* | (2006.01) | |
| *G06F 9/38* | (2018.01) | |
| *G06F 11/20* | (2006.01) | |
| *G06F 9/30* | (2018.01) | |
| *G06T 1/60* | (2006.01) | |
| *G06F 9/4401* | (2018.01) | |
| *G06T 15/00* | (2011.01) | |
| *G06T 11/40* | (2006.01) | |

(52) U.S. Cl.
CPC ............. *G06T 1/60* (2013.01); *G06F 9/3009* (2013.01); *G06F 9/3851* (2013.01); *G06F 9/4418* (2013.01); *G06F 9/48* (2013.01); *G06F 9/4881* (2013.01); *G06F 11/203* (2013.01); *G06T 11/40* (2013.01); *G06T 15/005* (2013.01)

(58) Field of Classification Search
CPC ........ G06F 9/48; G06F 9/3009; G06F 9/3851; G06F 11/203
See application file for complete search history.

(56) References Cited

U.S. PATENT DOCUMENTS

| | | |
|---|---|---|
| 5,850,504 A | 12/1998 | Cooper et al. |
| 6,049,339 A | 4/2000 | Schiller et al. |
| 7,161,705 B2 | 1/2007 | Klassen |
| (Continued) | | |

FOREIGN PATENT DOCUMENTS

| | | |
|---|---|---|
| AU | 2005246939 A1 | 7/2007 |
| AU | 2016277671 A1 | 7/2018 |
| AU | 2017248406 A1 | 5/2019 |

*Primary Examiner* — Matthew Salvucci
(74) *Attorney, Agent, or Firm* — Canon U.S.A., Inc. IP Division

(57) ABSTRACT

A method of rendering pages in a graphics rendering system operating in a multi-threaded mode. A plurality of pages to be rendered is received in the graphics rendering system, each of the plurality of pages having associated producing tasks and consuming tasks. Upon identifying one or more failed consuming tasks from the associated consuming tasks, generation of further producing tasks are suspended. Data associated with the identified one or more failed consuming tasks are processed by switching from the multi-threaded mode to a single threaded mode using memory freed in response to completion of processing of one or more of the remaining plurality of consuming tasks. One or more of the plurality of pages associated with the processed data are rendered.

9 Claims, 10 Drawing Sheets

(56) References Cited

U.S. PATENT DOCUMENTS

| | | | |
|---|---|---|---|
| 7,978,196 B2 | 7/2011 | Combes et al. | |
| 8,619,277 B2 | 12/2013 | Kang et al. | |
| 9,195,919 B2 | 11/2015 | Belbin et al. | |
| 9,262,704 B1 * | 2/2016 | Metcalfe | H04N 1/40068 |
| 9,317,892 B2 | 4/2016 | Veal et al. | |
| 2015/0277984 A1 * | 10/2015 | Abraham | G06F 9/5077 |
| | | | 718/1 |
| 2018/0181846 A1 | 6/2018 | Koziarz et al. | |

* cited by examiner

MEMORY ERROR RECOVERY FOR COMPLEX PAGE RIP

REFERENCE TO RELATED APPLICATIONS

This application claims the benefit under 35 U.S.C. § 119 of the filing date of Australian Patent Application No. 2018201347, filed 23 Feb. 2018, hereby incorporated by reference in its entirety as if fully set forth herein.

TECHNICAL FIELD

The present disclosure relates generally to the field of graphics processing and, in particular, to a method, apparatus and system for memory management and scheduling tasks in a multi-threaded raster image processor (RIP). The present disclosure also relates to a computer program product including a computer readable medium having recorded thereon a computer program for scheduling tasks in a multi-threaded RIP.

BACKGROUND

In commercial printing, printing speeds are in the thousands of pages-per-minute (ppm), typically measured in metres/second or monthly throughput. Such printing speeds are achieved using commodity hardware, and configuring software to have a suitable high level of parallelism.

Speeds of printing machines are increasing, as commodity hardware becomes cheaper and more powerful, customer demands increase, and processing becomes increasingly centralised on a global scale. Cloud-based services are an example of such trends. However, with improved hardware, deficiencies in scalability of existing software are exposed, and a need to adapt software and create new algorithms arises. Particularly, in order to take advantage of such parallelism, a process may be broken down into "tasks", which are largely independent and able to be executed in parallel.

In the printing of a page, graphical objects arrive in z-order, and can be organised into y-dimension bands, where each band is formed by one or more consecutive scan lines. Y-bands of the page can be rendered in parallel to increase printing speeds. To further parallelise the process of rasterization, the page can be split into layers. The incoming objects are split into the batches called z-layers. Each z-layer and each y-band can be processed independently by separate rasterising tasks.

Each rasterising task requires an amount of memory while running. Several different types of primary memory are available: input memory, working memory, intermediate output memory and finally output memory. As the rasterising jobs become more complex, more memory of each type is needed by the rasterising tasks, especially if optimal performance is to be achieved in such a multi-threaded system. When the rasterising tasks run increasingly in parallel, higher peak memory usage can be expected during job processing.

Even in rendering systems such as printer drivers where performance is a concern, memory usage still needs to be managed, and in many cases limited to a total reasonable in that system. In systems such as printer drivers, the amount of available memory can also vary significantly—the rendering system needs to adapt to varying levels of available memory, whilst still providing acceptable performance.

While various methods of memory management exist, many of the methods of memory management typically rely on complexity estimation of the input job. The estimation however is not always accurate and underestimation may result in some tasks failing due to lack of memory.

One method of recovering a failed task(s) is to re-run an entire failed job, or at least the entire page of the job which failed. A job typically comprises one or more pages, each page having one or more tasks. Each task is a block of work to be performed by a processor. For example, in one method, the failed portion of the job, consisting of at least one page, is sent for execution in serial mode. Such a method sacrifices processing efficiency (i.e., throwing away intermediate results and restarting the processing). While the probability of a successful outcome from re-running the failed part of the job may increase, success is still not guaranteed.

Other methods of recovering a failed task(s) reduce the quality of the output raster, in order to reduce the intermediate output or final output memory requirements. Methods of reducing the quality of the output raster sacrifices quality of the result (i.e., throwing away some details of output data) in the process of producing final rasterised output within a reduced peak memory.

SUMMARY

It is an object of the present invention to substantially overcome, or at least ameliorate, one or more disadvantages of existing arrangements.

Disclosed are arrangements which seek to provide a system and a method for graphics processing, particularly of a print job, including the management of the rasterization tasks so as to effectively recover from memory deficiency or memory allocation failure. The disclosed arrangements do not throw away intermediate results from processing done prior to a fault occurring. The disclosed arrangements seek to recover from a failure without reducing the quality of the final output.

According to one aspect of the present disclosure, there is provided a method of rendering pages in a graphics rendering system operating in a multi-threaded mode, the method comprising:

receiving a plurality of pages to be rendered in the graphics rendering system, each of the plurality of pages having associated producing tasks and consuming tasks suspending, upon identifying one or more failed consuming tasks from the associated consuming tasks, generation of further producing tasks;

processing data associated with the identified one or more failed consuming tasks by switching from the multi-threaded mode to a single threaded mode using memory freed in response to completion of processing of one or more of the remaining plurality of consuming tasks; and rendering one or more of the plurality of pages associated with the processed data.

According to another aspect of the present disclosure, switching back to multi-threaded mode upon completion of the data processing and resuming the plurality of producing tasks.

According to another aspect of the present disclosure, there is provided a method of swapping storage of input data; intermediate data and output data storage for RAM to disk, before resuming failed tasks and remaining tasks in single-threaded mode.

According to another aspect of the present disclosure, there is provided a system for rendering pages in a graphics rendering system operating in a multi-threaded mode, the system comprising:

a memory for storing data and a computer program;

a processor coupled to the memory for executing the program, the program comprising instructions for:

receiving a plurality of pages to be rendered in the graphics rendering system, each of the plurality of pages having associated producing tasks and consuming tasks;

suspending, upon identifying one or more failed consuming tasks from the associated consuming tasks, generation of further producing tasks;

processing data associated with the identified one or more failed consuming tasks by switching from the multi-threaded mode to a single threaded mode using memory freed in response to completion of processing of one or more of the remaining plurality of consuming tasks; and rendering one or more of the plurality of pages associated with the processed data.

According to another aspect of the present disclosure, there is provided an apparatus for rendering pages in a graphics rendering system operating in a multi-threaded mode, the apparatus comprising:

means for receiving a plurality of pages to be rendered in the graphics rendering system, each of the plurality of pages having associated producing tasks and consuming tasks;

means for suspending, upon identifying one or more failed consuming tasks from the associated consuming tasks, generation of further producing tasks;

means for processing data associated with the identified one or more failed consuming tasks by switching from the multi-threaded mode to a single threaded mode using memory freed in response to completion of processing of one or more of the remaining plurality of consuming tasks; and means for rendering one or more of the plurality of pages associated with the processed data.

According to another aspect of the present disclosure, there is provided a computer readable medium having stored thereon a computer program for rendering pages in a graphics rendering system operating in a multi-threaded mode, the program comprising:

code for receiving a plurality of pages to be rendered in the graphics rendering system, each of the plurality of pages having associated producing tasks and consuming tasks;

code for suspending, upon identifying one or more failed consuming tasks from the associated consuming tasks, generation of further producing tasks;

code for processing data associated with the identified one or more failed consuming tasks by switching from the multi-threaded mode to a single threaded mode using memory freed in response to completion of processing of one or more of the remaining plurality of consuming tasks; and code for rendering one or more of the plurality of pages associated with the processed data.

Other aspects are also disclosed including computerized apparatus for performing the methods and programs and storage media for instruction performance of the methods by a processor.

BRIEF DESCRIPTION OF THE DRAWINGS

At least one embodiment of the invention will now be described with reference to the following drawings, in which.

DETAILED DESCRIPTION INCLUDING BEST MODE

Figure 1:
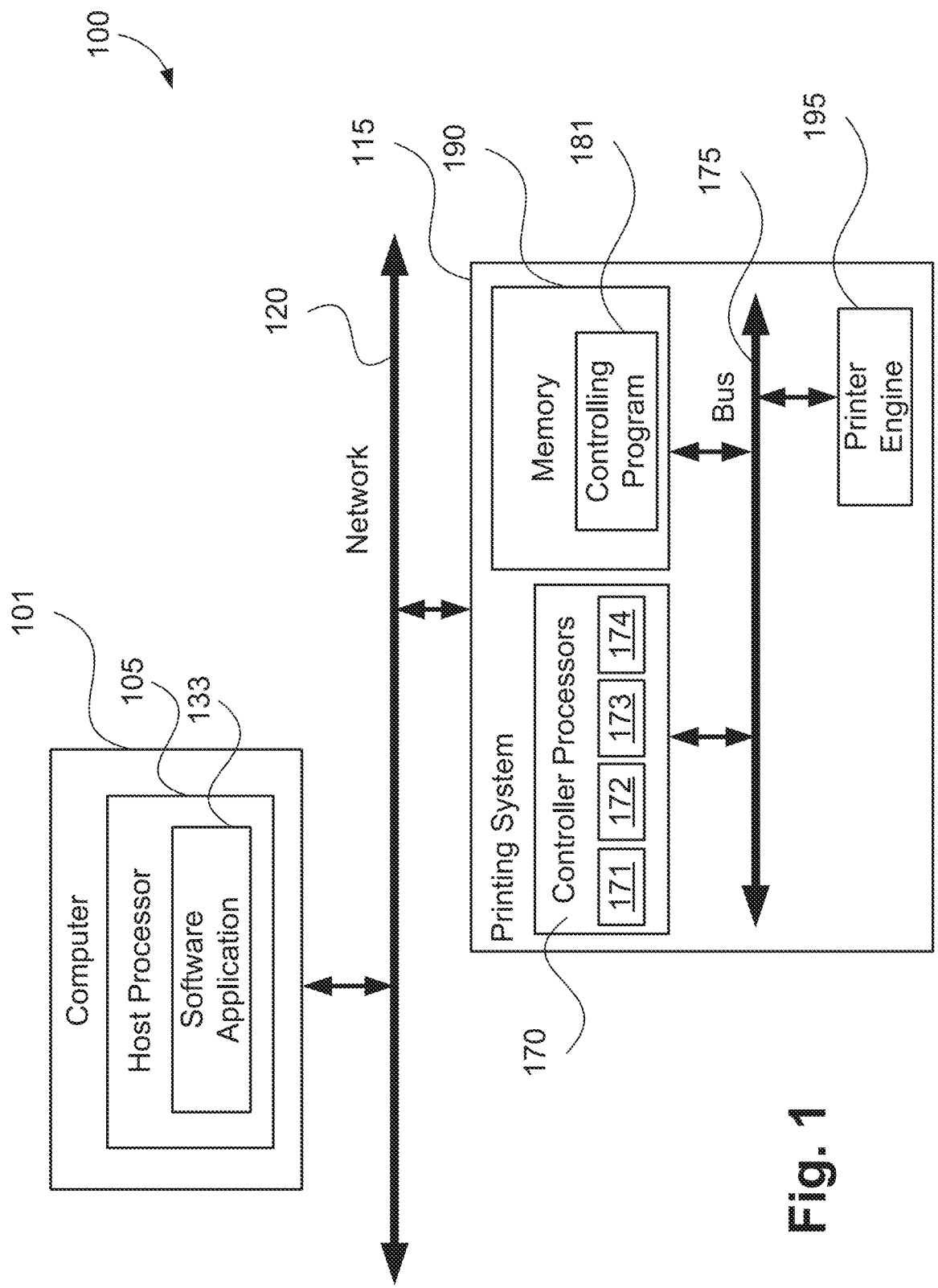
FIG. 1 is a schematic block diagram of a multi-processor printing system for rendering a document according to the present disclosure.

Where reference is made in any one or more of the accompanying drawings to steps and/or features, which have the same reference numerals, those steps and/or features have for the purposes of this description the same function(s) or operation(s), unless the contrary intention appears.

Methods are described as implemented in a multi-threaded raster image processor (RIP), and more specifically a builder module that constructs a printable representation of each page. The described methods may be applied to other multi-threaded applications such as video processing.

FIG. 1 shows a schematic block diagram of a pixel rendering system 100 for rendering graphic objects. The render processing performed by the system 100 may be used for printing. However, the render processing performed by the system 100 may include display screen rendering, for example, using a print preview function available in many applications. The pixel rendering system 100 includes a computer module 101 connected to a printing system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115). The computer 101 and printing system 115 may be connected by a cable used to communicate between devices via ports, such as a USB, serial, parallel or FireWire port.

The computer module 101 comprises at least one host processor 105 for executing a software application 133, such as a word processor or graphical software application.

The printing system 115 comprises plurality of controller processors 170. As shown in the example of FIG. 1, the controller processors 170 comprise four processors 171, 172, 173 and 174, for executing one or more software code modules forming a controlling program 181 which is stored in a memory 190. Alternatively, the controller processors 170 may comprise processors that take the form of single-core CPUs, GPUs, or any other form of computer processor such as field-programmable gate arrays (FPGAs). In another alternative, the controller processors 170 may comprise a mixture of the various kinds of processors described above.

The printing system 115 also comprises a printer engine 195 coupled to the controller processors 170, via an interconnected bus 175. The controlling program 181 accepts a printable document 201 produced by the software application 133 and produces, via execution on the controller processors 170, pixel data values for printing. The pixel data values may then be stored in the memory 190 and reproduced as pixels by the printer engine 195, for example. The controlling program 181 may be executed by the controller processors 170 in one or more threads of execution. A thread is formed by a number of instructions or steps that are executed in sequence by one of the processors 171-174. The controlling program 181 will be further described in detail below with reference to FIG. 2.

Figure 3A:
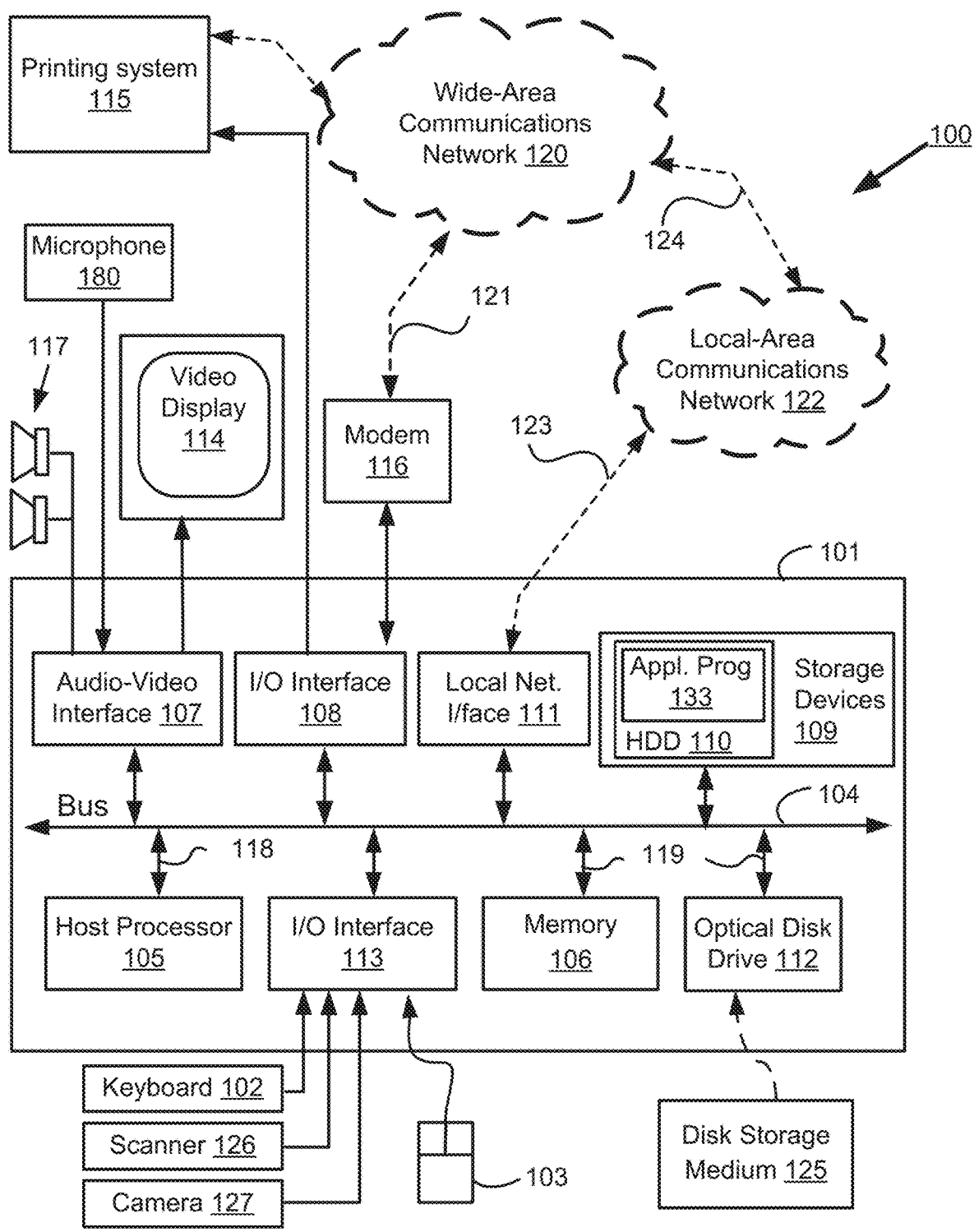
FIGS. 3A and 3B collectively form a schematic block diagram of the general purpose computer system of FIG. 1 in more detail.

As seen in more detail in FIG. 3A, the pixel rendering system 100 includes: the computer module 101 having associated input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN); such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example; the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and for direct connection to the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111. The printing system 115 may alternatively couple to the computer module 101 via the wide area network 120 as illustrated, or to the local network 122 (not illustrated).

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blue ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

Methods described below may be implemented using the system 100 wherein one or more steps of the processes of FIGS. 2 and 4 to 9, to be described, may be implemented as one or more code modules of the software application program 133 executable within the system 100. One or more of the steps of the described methods may be effected by instructions 131 (see FIG. 3B) in the software 133 that are carried out within the system 100.

As also described below, one or more steps of the processes of FIGS. 2 and 4 to 9 to be described, may be implemented as one or more of the code modules forming the controlling program 181 executable within the printing system 115. Again, one or more of the steps of the described methods may be effected by instructions, similar to the instructions 131 in the software 133.

The software instructions 131 implementing the software 133 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application program 133 and the corresponding code modules mentioned above may be executed to implement one or more graphical user interfaces (GUIs) to be rendered or otherwise represented upon the display 114, and via which the document intended for printing may be viewed using a print preview function. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
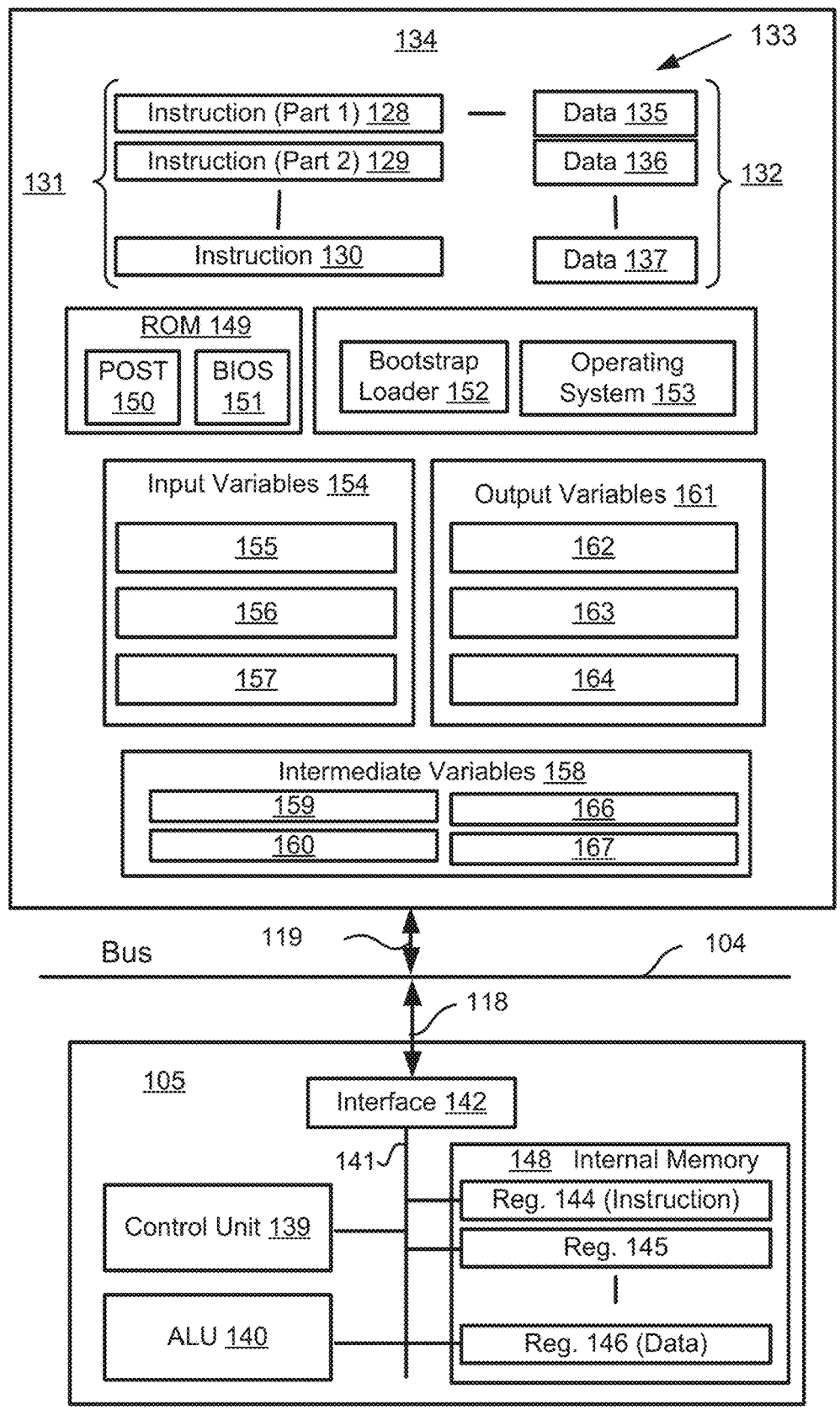

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically, checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

As described below, the RAM memory 106 and other forms of memory (e.g., cache) may be referred to as 'primary' memory. The hard disk drive 110 may be referred to as 'secondary' memory. The primary memory typically has different characteristics to the secondary memory (i.e., hard disk memory 110). For example, the primary memory may have less storage capacity and faster storage speeds (e.g., read/write) than the secondary memory. The second memory may have limited read/write storage speeds but a higher storage capability than the primary memory.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically, includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 114, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines hick instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2 and 4 to 9 may be associated with one or more segments of the program 133 and is performed by the register section 144, 145; 147, the ALU 140, and the control unit 139 in the processor 105 working together to perform the fetch, decode, and execute cycles for every instruction in the instruction set for the noted segments of the program 133.

As described above, one or more steps of the processes of FIGS. 2 and 4 to 9, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by, the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
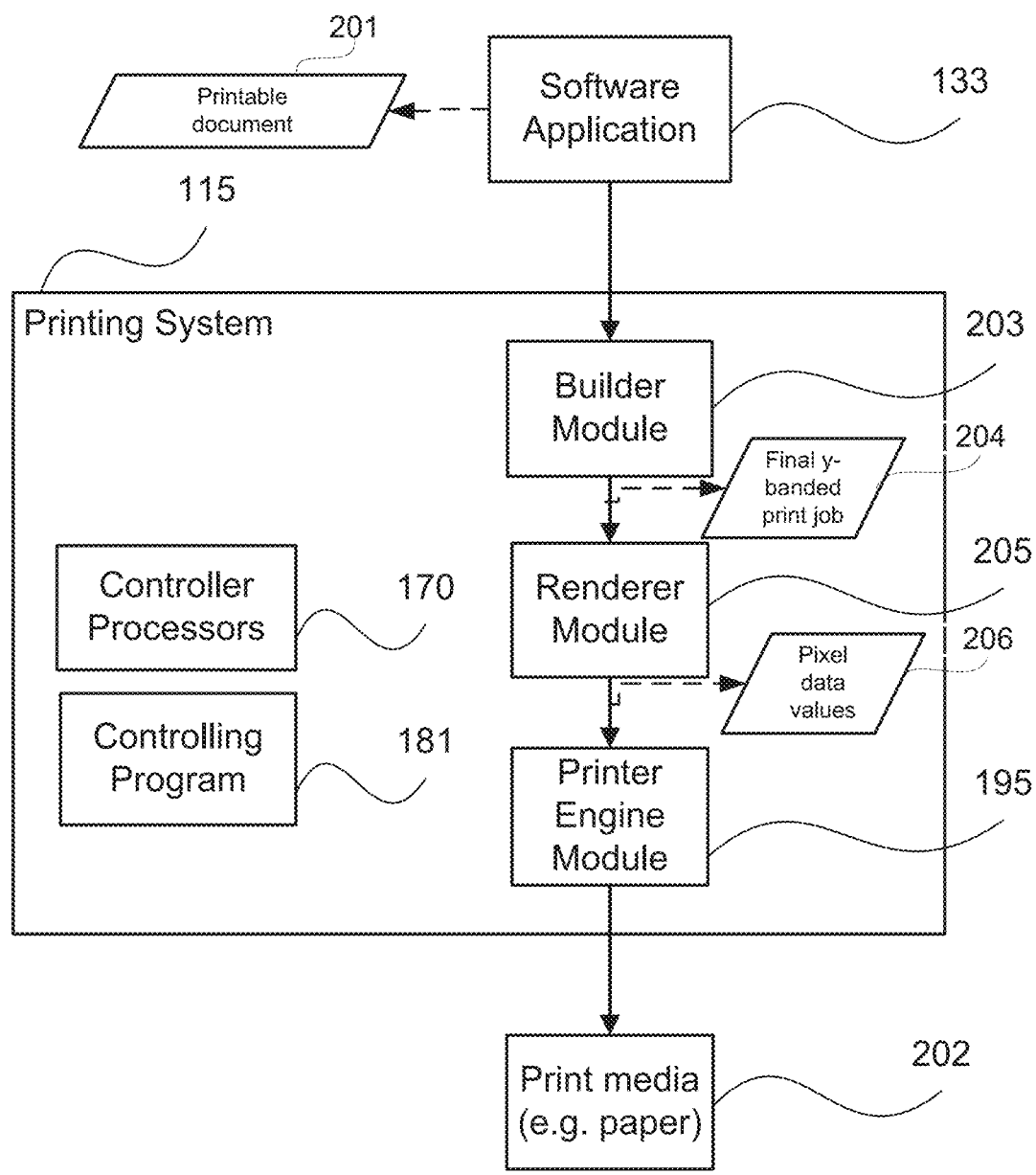
FIG. 2 is a software architecture for the printing system of FIG. 1.

FIG. 2 shows a software architecture for printing a printable document 201 using the printing system 115. Builder module 203 and renderer module 205 described below may be formed by one or more of the code modules of the controlling program 181.

The software application 133, for example, executing on the computer module 101, provides the printable document 201 to the printing system 115 for printing to an output (print) medium 202, such as a paper sheet. The printable document 201 is typically provided in the form of a description of the printable document 201, the description being specified using a Page Description Language (PDL), such as Adobe® PDF or Hewlett-Packard® PCL. The PDL provides descriptions of graphic objects on each page to be rendered onto the print medium 202 in a rendering (or z) order, as opposed to a raster image (i.e., a bitmap of pixel values) of each page to be printed.

Builder module 203 receives a page of a printable document 201 in PDL form and generates an intermediate representation known as a final y-banded print job 204 of the page. The final y-banded print job 204 is printable data divided into y-bands corresponding to bands of the output print medium, and which can be reproduced by display on the display 114 or by printing by the printer 115. Y-bands are horizontal strips of a page ordered vertically according to the position of the horizontal strips on the page. The position on the page is referred to below as y-order. Y-bands are numbered according to their y-order, from 0 to n, where the first y-band (at the top of the page) is numbered zero (0) while last y-band (at the bottom of the page) is numbered n−1. The printing system 115 then uses a renderer module 205 to render the final y-banded print job 204 to pixel data values 206. The pixel data values 206 are printed onto a print medium 202, such as paper, using a printer engine module 195. The printer engine module 195 may, for example, be an electro-photographic engine.

The builder module 203, renderer module 205 and print engine module 195 may reside within a monolithic printing system, such as the system 115. An arrangement where the builder module 203, renderer module 205 and print engine module 195 reside within a monolithic printing system will be referred to below as an integrated system. Alternatively, the builder module 203 may reside on a first device while renderer module 205 and print engine module 195 may reside on a second, separate device. In an arrangement where the builder module 203 resides on a first device and the renderer module 205 and print engine module 195 reside on a second, separate device, the final y-banded print job 204 is sent from the first device to the second device before the renderer module 205 renders the final y-banded print job to pixel data values 206. An arrangement where the module 203 resides on a first device and the renderer module 205 and print engine module 195 reside on a second, separate device will be referred to below as a split system. In one implementation of such a split system, the builder module 203 may be formed within the computer module 101, for example, as a printer driver application.

The builder module 203 and renderer module 205 and print engine module 195 may be implemented as one or more code modules of the controlling program 181 which is executed by the controller processors 170 within the printing system 115. The builder module 203 will be described in more detail later with reference to FIG. 4 and FIG. 5.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Returning to FIG. 1, in the pixel rendering system 100, the software application 133 creates printable documents for printing, such as printable document 201. The printable document 201 often contains graphic objects such as text, lines, fill regions, and image data. The software application 133 sends a high-level description of the printable document 201 (e.g., a PDL file) via the network 120 to the controlling program 181 that is executed by the controller processors 170 of the printing system 115. The printable document 201 contains all information required by the printing system 115 to render and print each page of the document.

In alternative arrangements, the printing system 115, the controller processors 170 and controlling program 181, may be resident in separate servers connected to the network 120. In still another alternative arrangement, the printing system 115, the controller processors 170 and controlling program 181 may be resident in a distributed network of servers. The raster image representation produced by the controlling program 181 may be sent to the printer engine module 195 via a network rather than the bus 175.

The described methods may also be implemented as part of other graphics rendering systems in which an intermediate representation is rendered (e.g., for displaying PDF documents on an LCD display). As such, the described methods are not limited to printing systems.

Figure 4:
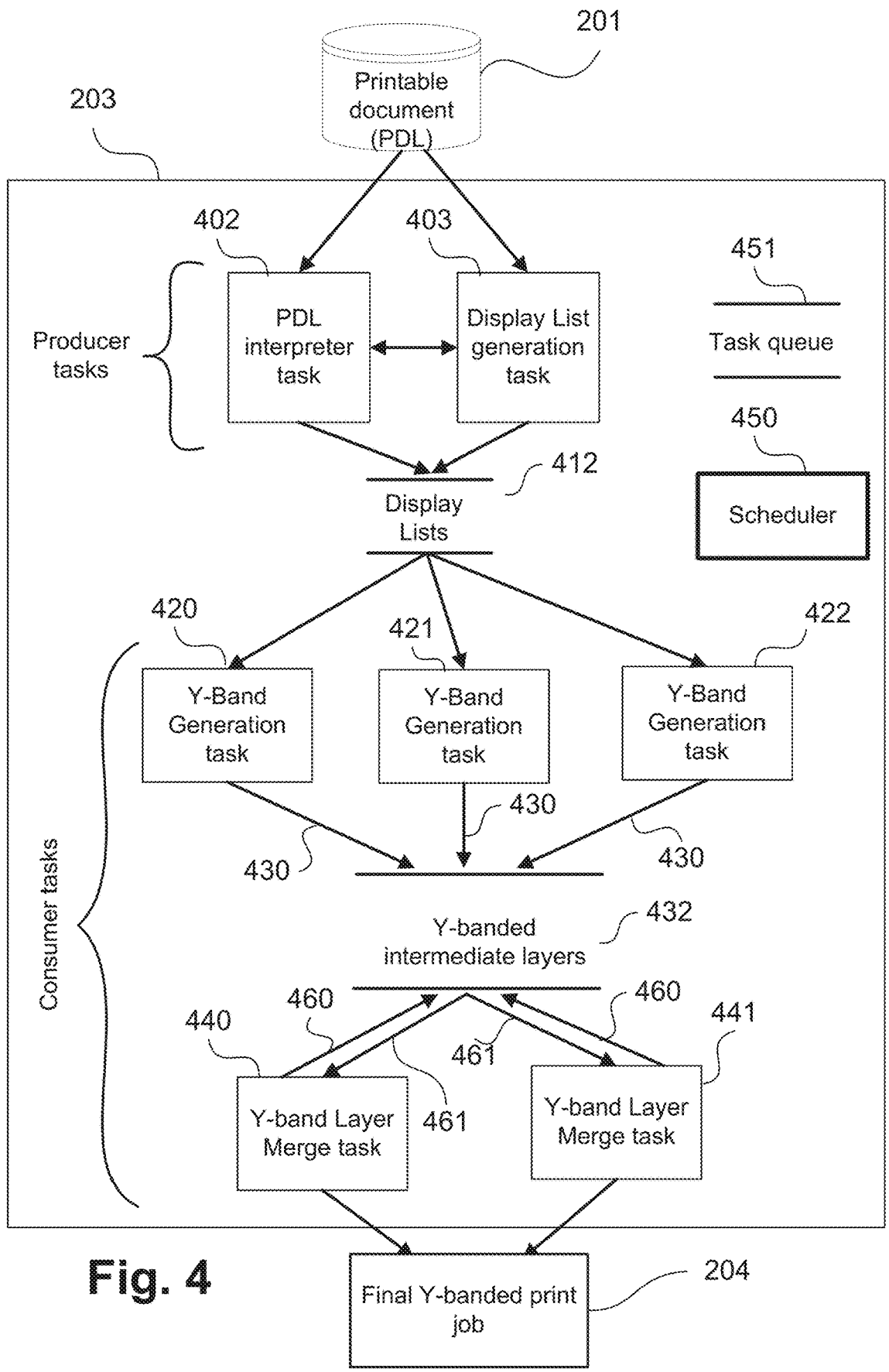
FIG. 4 is a schematic block diagram representation of the tasks and components of the builder module of FIG. 2 according to one arrangement.

The builder module 203 will now be described in more detail with reference to FIG. 4. The builder module 20'3 contains or otherwise implements a preferred method of scheduling tasks according to the present disclosure. The builder module 203 creates (or builds) a final y-banded print job 204 which is an intermediate representation of a page of the printable document 201 being or to be printed. The term "intermediate representation" refers to a data format which is intermediate between the page description language (PDL) representation and pixel data of the printable document 201 being printed. Instructions from the page description language (PDL) representation may be pre-processed into basic commands, which a printing system 115 can handle. For example, such basic commands may be generated by decomposing objects into sets of pixel aligned edges and colour data in the form of fills or compositing sequences. In the example where basic commands are generated by decomposing objects into sets of pixel aligned edges, the sets of pixel aligned edges and colour data in the form of fills or compositing sequences constitute the final y-banded print job 204. The builder module 203 includes a PDL interpreter 402 (PDLi) which operates to interpret the PDL document 201 and Display List Generator 403 (DL). The PDL interpreter 402 and display list generator 403 collectively build display lists 412 for the document 201. A task queue 451 is formed to represent a set of tasks created to process data from display list 412, being y-band generation (YG) tasks 420-422, and y-band layer merge (YM) tasks 440-441. A scheduler 450 picks up the tasks (i.e., y-band generation tasks 420-422 and y-band layer merge tasks 440-441) and assigns the tasks for execution to physical threads available from a thread pool, as soon as threads become available. Ordinarily, tasks are executed in the order of arrival. However, the scheduler 450 may change the order, for example, as the response to identifying failure of some tasks, as will be described below. As such, each YG task results in a rendering of a band of image data and, by the allocation of YG tasks to multiple threads, permits multiple renderers to operate simultaneously for different bands. The YM tasks subsequently operate to merge image data for individual bands, and again the merging of image data for individual bands may be performed simultaneously for multiple bands using multiple renderers implemented using multiple threads.

PDLi task 402 and DL task 403, are collectively called producing tasks, because the PDLi task 402 and DL task 403 produce a sequence of graphic objects in z-order. The number of graphical objects on the document page as well as other information, such as the bounding box of each object, may be determined from the PDL input printable document 201. Display lists 412 stores the graphic objects produced by the PDL interpreter 402 and is stored in input memory which may be located in the memory 190. Display lists 412 comprise a set of y-band display lists, one per y-band. Each y-band display list, also referred to as a display list for a y-band or y-band data, contains a sequence of graphic objects, or references to graphical objects. The sequence of graphic objects, or references to graphical objects, may be sorted by the first scan lines on which the graphic objects appear within the y-band. An example of splitting the graphic objects of a page of a printable document 201 into y-band display lists will be described below with reference to FIGS. 6A and 6B.

For each y-band display list in the set of display lists 412, a corresponding y-band generation task (e.g., the task 420) is created. In the example shown in FIG. 4, the producing tasks 402 and 403 split the graphic objects of a page of the printable document 201 into three y-band display lists 412a-412c. Therefore, three y-band generation tasks 420-422 are created. Each y-band generation task (e.g., task 420) receives a y-band display list (e.g. list 412a) and converts that display list to a corresponding y-banded intermediate layer 430a-430c (i.e. an intermediate representation for the y-band display list). Intermediate layers are collected into a set of intermediate layers 432 which are stored in intermediate output memory which may be located in memory 190 as depicted in FIG. 4. Subject to the PDL document 201, any number of display lists 412 and y-band generation tasks 420-422 may be formed.

A suitable representation for z-layers of y-banded intermediate layers 432 that represents graphical data in an intermediate form between display lists 412 and rendered pixels, may be used in the described methods. The representation needs to support merging of y-band z-layers while correctly preserving compositing operation order. Suitable representations include run-based representations and region-based representations. With a run-based representation, the geometric area of the y-band is divided into scan lines, and each scan line is divided into segments, also known as runs. With a region-based representation, the geometric area of the y-band is divided into two-dimensional portions known as regions. The lengths and positions of the runs, or the shapes of the regions, are derived from the outlines of the graphic objects received from PDL interpreter 402. Planar maps and trapezoidal decomposition are examples of region-based representations. Alternatively, representations using pixel-accurate rasterized edges may also be used.

In a one implementation, each run or region is stored with an associated sequence of one or more compositing operations that describe how to render the run or region, that is, how to generate the values of the rendered pixels. For example, a region or a set of runs representing an object of uniform colour will be associated with an instruction to paint that colour. A region or set of runs representing the area of overlap of two composited objects will be associated with a set of instructions comprising an instruction to paint the first colour of the first object and an instruction to composite the colour of the second object with the painted first colour.

Producing a run-based or pixel-accurate region-based representation of a y-band z-layer by y-band generation task 420-422 may be performed by scan converting the outlines of the objects in the y-band display list 412a-412c. Rather than rasterizing fully into rendered pixel values, intermediate results comprising intersections of object outlines with scan lines may be stored, for example, within memory 190. A region-based method also involves tracking edges from one scan line to the next and storing the sequence of scanline intersection points with a region boundary. As each run or region is formed, the set of instructions that would be used to render the run or region is collected and represented as a sequence of operations associated with the run or region.

Merging representations of two (or more) y-band z-layers as performed by YM task 440,441 involves forming the intersection of the runs or regions of one z-layer with the runs or regions of the other. In general, in each area of intersection, the sequence of compositing operations of the two z-layers are concatenated to form the sequence of operations for the merged layer. However, where a run or region in the layer with higher z-order is opaque (i.e., the result of merging depends on the upper layer only), the run intersection and compositing operation concatenation may be avoided in order to avoid unnecessary spatial fragmentation and to optimize memory usage and performance. In the case where the run intersection and compositing operation concatenation is not performed, the corresponding run or region in the merged result will only contain the data from the opaque run or region in the z-layer with higher z-order.

In order to produce the final y-banded print job 204 that represents an intermediate representation of an entire page of the printable document 201, one or more YM tasks (e.g., tasks 440-441) may be required. Each YM task 440 typically receives two or more y-banded intermediate layers from the y-banded intermediate layers output memory 432 (as shown by arrow 461) and merges the two or more y-banded intermediate layers into a single y-banded representation, which may be another y-banded intermediate layer similar to 430. The merged y-banded intermediate layer is then stored into output memory which may be located in memory 190, as depicted in FIG. 4, in the set of y-banded intermediate layers 432 (as shown by arrow 460), in anticipation of additional y-band merging. If there are no more y-banded intermediate layers left to merge, the final y-band layer merge produces the final y-banded print job 204 of a page of the printable document 201 which, as depicted in FIG. 4, is also stored in output memory.

The final merged representation format 204 sent to renderer module 205 may be essentially the same as the intermediate representation format. Renderer 205 may produce rendered pixels by taking each run or region and performing the associated sequence of compositing operations to generate pixel values. Often, a renderer is required to produce output in raster order, in which case for a region-based representation, a sequence of active regions for the current output scan line is maintained as rendering progresses from one scan line to the next.

The y-band generation tasks (e.g., tasks 420-422) and YM tasks (e.g., tasks 440-441), are collectively called consuming tasks, because the y-band generation tasks and YM tasks consume a sequence of graphic objects in z-order, or Display List 412, produced by the producing tasks.

In addition to the memory types described above, each consuming task has associated private memory, called working memory, which may be configured in memory 148 or 106. Working memory is used by the consuming tasks to store working data and state information used for or during generating an intermediate format representation. For example, the working memory in a y-band generation task may store vectorization information for each object edge, edge tracking information and object arrangement tracking information for generating intermediate data.

All types of memory described above usually come from the same memory pool, with the exception of working memory that may come from the same pool or from internal processor memory 148.

Methods of scheduling tasks of a multi-threaded application are described bellow. The methods of scheduling tasks of a multi-threaded application are described with reference to the tasks of the builder module 203 described with reference to FIG. 4. To perform the scheduling, the builder module 203 includes the scheduler 450 and the task queue 451. The scheduler 450 performs the operations of adding tasks to the task queue 451, and deciding which task to run on an idle thread.

Splitting a page of graphic objects into y-hands and z-layers, will now be described with reference to FIGS. 6A and 6B.

Figure 6A:
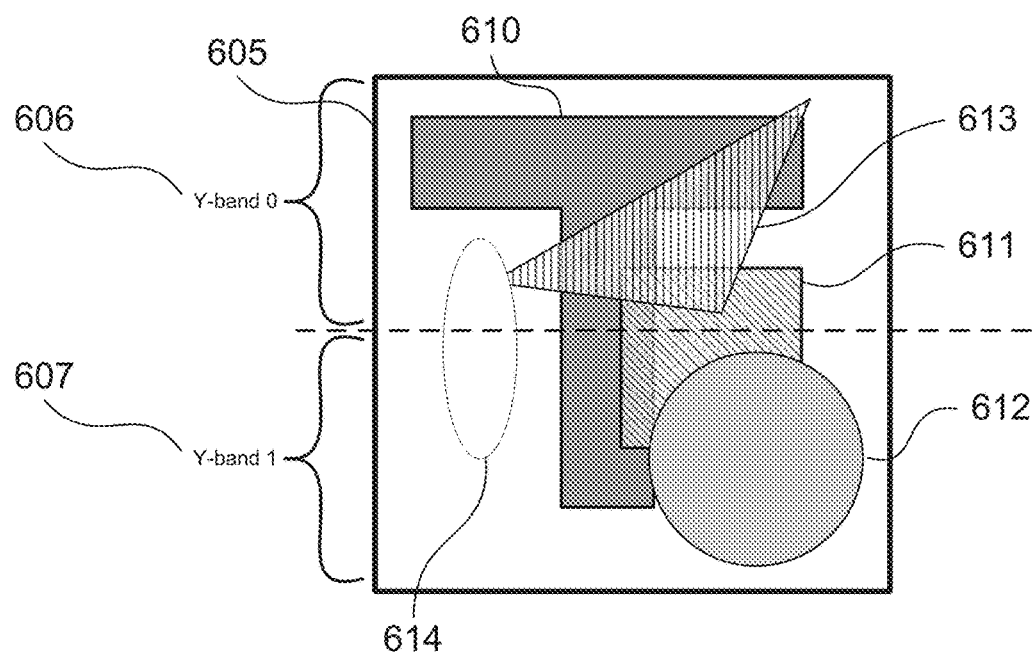
FIG. 6A shows an example page with graphic objects.

FIG. 6A shows a page 605 comprising five graphic objects, 610-614. Graphic object 610 has the smallest (lowest) z-order, followed by graphic object 611 which has the next highest z-order, followed by graphic object 612, followed by graphic object 613, followed by graphic object 614 which has the highest z-order of all graphic objects 610-614. The page 605 is split into two y-bands 606-607, numbered according to the vertical order of the two y-bands 606-607 on the page. First y-band 606 is numbered y-band zero (0), while the next y-band, which in the example of FIG. 6A happens to be the last y-band 607, is numbered y-band one (1). More generally, a y-band may be considered as a region or space on a print output medium such as paper, actual rendered output, or a memory area that holds different data for a particular y-band. The methods described below are applicable to y-bands or similar spatial regions or tiles.

Figure 6B:
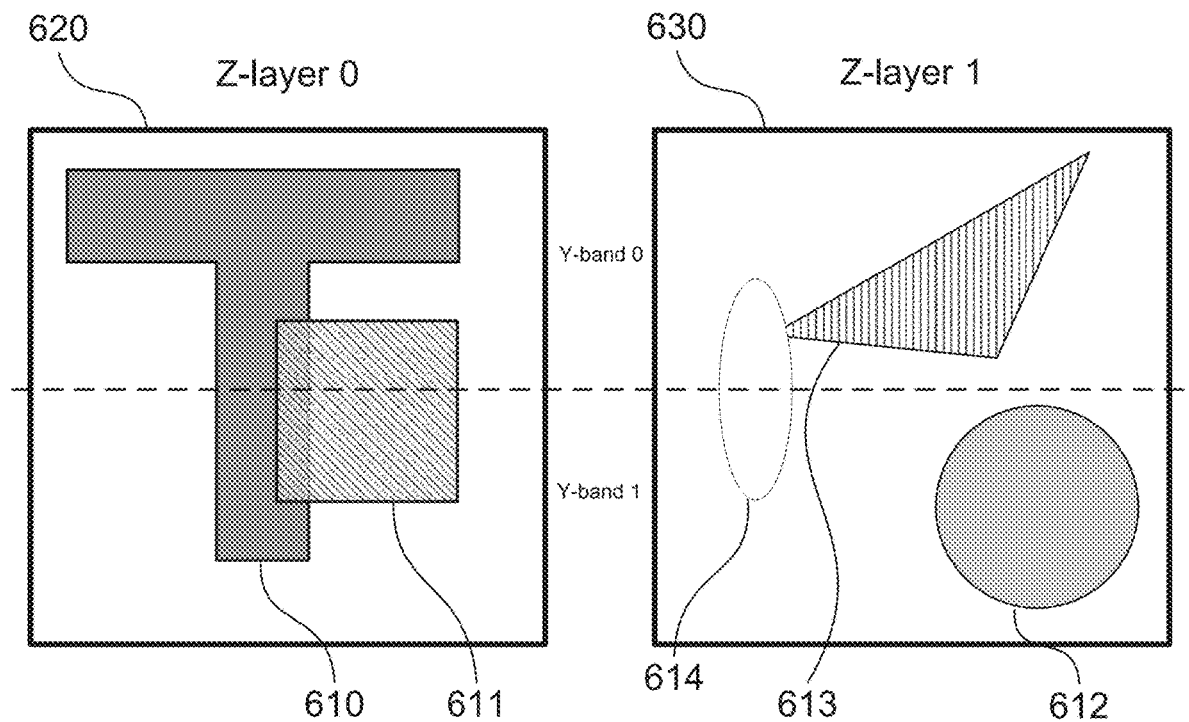
FIG. 6B show the split of the page of FIG. 6A into y-bands and z-layers.

Graphic objects 610-614 of the page 605 are split into two z-layer stores 620 and 630 as shown in FIG. 6B. Z-layer store 620 contains the two graphic objects with smallest z-order, being graphic object 610 and graphic object 611. Z-layer store 630 contains the three graphic objects with largest z-order, being graphic object 612, graphic object 613 and graphic object 614. Z-layer stores 620 and 630 may also be numbered according to the z-order of the objects of the stores 620 and 630 on the page. The bottom-most z-layer store 620 is numbered z-layer zero (0), while the next z-layer store, which in the example of FIG. 6B happens to be the topmost z-layer store 630, is numbered z-layer store one (1).

Graphic objects on a page may also be split into y-bands according to spatial boundaries of each of the objects. An object that intersects a given y-band belongs to that y-band. An object that intersects a single y-band only is an object local to that y-band. An object that intersects multiple y-bands is a shared object. Among graphic objects 610-614 of the page 605, objects 610, 611 and 614 are shared objects, while object 613 is local to y-band zero (0) and object 612 is local to y-band one (1).

A display list for a y-band is a data structure for the y-band. A display list for a given y-band refers to a given object if that given object intersects the given y-band. In FIG. 6A, the display list for y-band zero (0) refers to four objects. Three of the objects referred to by the display list for y-band zero (0), object 610, object 611 and object 614, are shared objects, while the fourth object 613 referred to by display list for y-band zero (0) is a local object in y-band zero (0) (i.e. lies entirely within spatial bounds of y-band zero (0)). The display list for y-band one (1) refers to four objects. Three of the objects referred to by the display list for y-band one (1), object 610, object 611 and object 614, are shared objects while the fourth object 612 referred to by display list for y-band one (1) is a local object in y-band one (1).

A display list for a given y-band refers to a given z-layer if said display list for the y-band refers to any shared object contained by the given z-layer. In FIG. 6B, the display list for y-band zero (0) refers to z-layer zero (0) (e.g., via reference to shared object 610 and shared object 611), and to z-layer one (1) (via reference to shared objects 614). The display list for y-band one (1) also refers to z-layer zero (0) and z-layer one (1), via references to the same shared objects.

Figure 5:
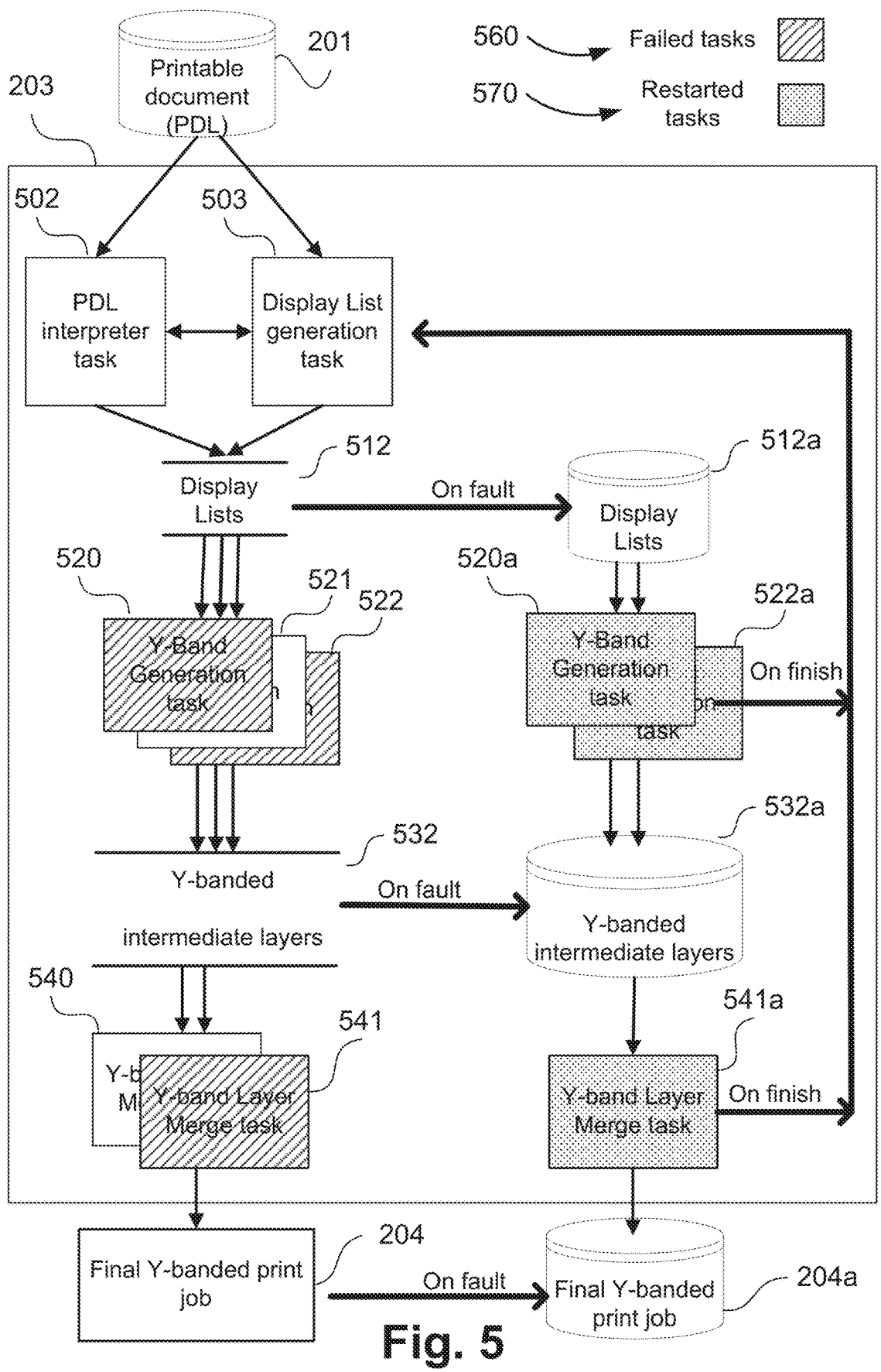
FIG. 5 is a schematic block diagram representation of the tasks and components of the builder module of FIG. 2 according to another arrangement.

FIG. 5 shows the builder module 203 according to another arrangement. The builder module 203 of FIG. 5 has enabled fault recovery.

The builder module 203 of FIG. 5 includes a PDL interpreter 502 (PDLi) which operates to interpret the PDL printable document 201. The builder module 203 of FIG. 5 also includes display list generator 503 (DL), which operates to generate display lists 512, collectively built by PDLi 502 and DL 503, Y-band generator tasks (or spatial region generation task) 520 through 522 consuming display list data and outputting data of Y-banded, intermediate layers 532, and finally Y-banded Layer merge tasks (spatial region merge task), outputting final Y-banded print job 204. The builder module 203 of FIG. 5 also includes the scheduler 450 and task queue 451 (not shown in FIG. 5). The operation of scheduler 450 in the recovery mode, including alteration of order of consuming task execution, will be described below.

The builder module 203 of FIG. 5 also contains an extra display list instance 512a, stored on hard disk 110, and an extra Y-banded intermediate layers instance 532a stored on hard disk 110. Final Y-banded print job 204a, as seen in FIG. 5, may also be stored on hard disk 110.

In case of any y-banded Gen task or Y-hand layer merge task failure being identified (e.g., due to memory allocation fault), the scheduler 450 suspends all producing tasks, transfers the data from all stores (i.e., 512 and 532 and 204) in RAM memory 106 (i.e., primary memory) to corresponding stores on the hard disk 110 (i.e., secondary memory), in the process releasing RAM memory 106 previously occupied by stores 512, 532 and 204. The scheduler 450 then re-runs the identified failed tasks using data from the hard disk stores 512a, 532a and 204a in single-threaded mode. In the example of FIG. 5, failed tasks are marked as dashed rectangles (e.g., 520), while the re-started tasks are marked as dotted rectangles (e.g., 520a). In the example of FIG. 5, tasks 520, 522 and 541 failed. After transferring data to the corresponding hard disk stores, the identified failed tasks are restarted as tasks 520a, 522a and 541a, respectively. Tasks 521 and 540 completed successfully and are thus not re-run. Memory that was being used by tasks 521 and 540 are thus freed up and available for use by the failed tasks 520, 522 and 541.

The builder 203 of FIG. 5 operates in the recovery mode until all disk stores 520a, 522a and 541a are processed and no data is left in the disk data stores 520a, 522a and 541a. In order to consume the data left in the disk data stores 520a, 522a and 541a, new consuming tasks may need to be created to process the data that still exists. For example, at the point of identifying failure, some display list data may have been generated by producing tasks, that has not yet been processed by any Y-band Gen task. After the identified failure, data will exist in display list 512a. For such data existing in display list 512a, new Y-band. Gen tasks and possibly y-band layer merge tasks are created.

Furthermore, at the point of failure, some data may exist in the final y-banded print job store 204a. The data existing in the final y-banded print job store 204a at the point of failure may be the data that was generated prior to the failure but not yet sent to the renderer module 205. The data existing in the final y-banded print job store 204a at the point of failure may also be partial output of a failed y-band layer merge task (such as task L541). The failed y-band layer merge task such as task L541, is re-run (as task L541a) using the hard disk store 204a as output.

To complete the recovery, all hard disk stores need to be consumed. Data from the hard disk store 204a needs to be consumed by running a rendering task by the rendering module 205. In particular, in the example of FIG. 5, data generated by y-band layer merge tasks L541 and completed by y-band layer merge tasks L541a, is written to final y-banded print job store 204. A rendering task that consumes the data from the hard disk store 204a needs to be run by renderer module 205. In comparison, the regular rendering task that runs outside of the fault recovery processing, reads from final y-banded print job store 204.

After all data stores on the hard disk 110 have been consumed, and all consuming tasks have finished, the fault recovery processing completes, and the scheduler 450 resumes the stopped producing tasks and reverts to the normal operating mode, where data storage in RAM memory 106 only is used and consuming tasks are scheduled for execution in a multi-threaded environment. The example fault recovery process involving YG task failures and re-running of failed tasks and running of additional tasks in order to consume all data from stores on the hard disk 110, will be described below with respect to FIG. 9. The resumption of normal operating mode in the example of FIG. 9, happens at timepoint 970.

Figure 7:
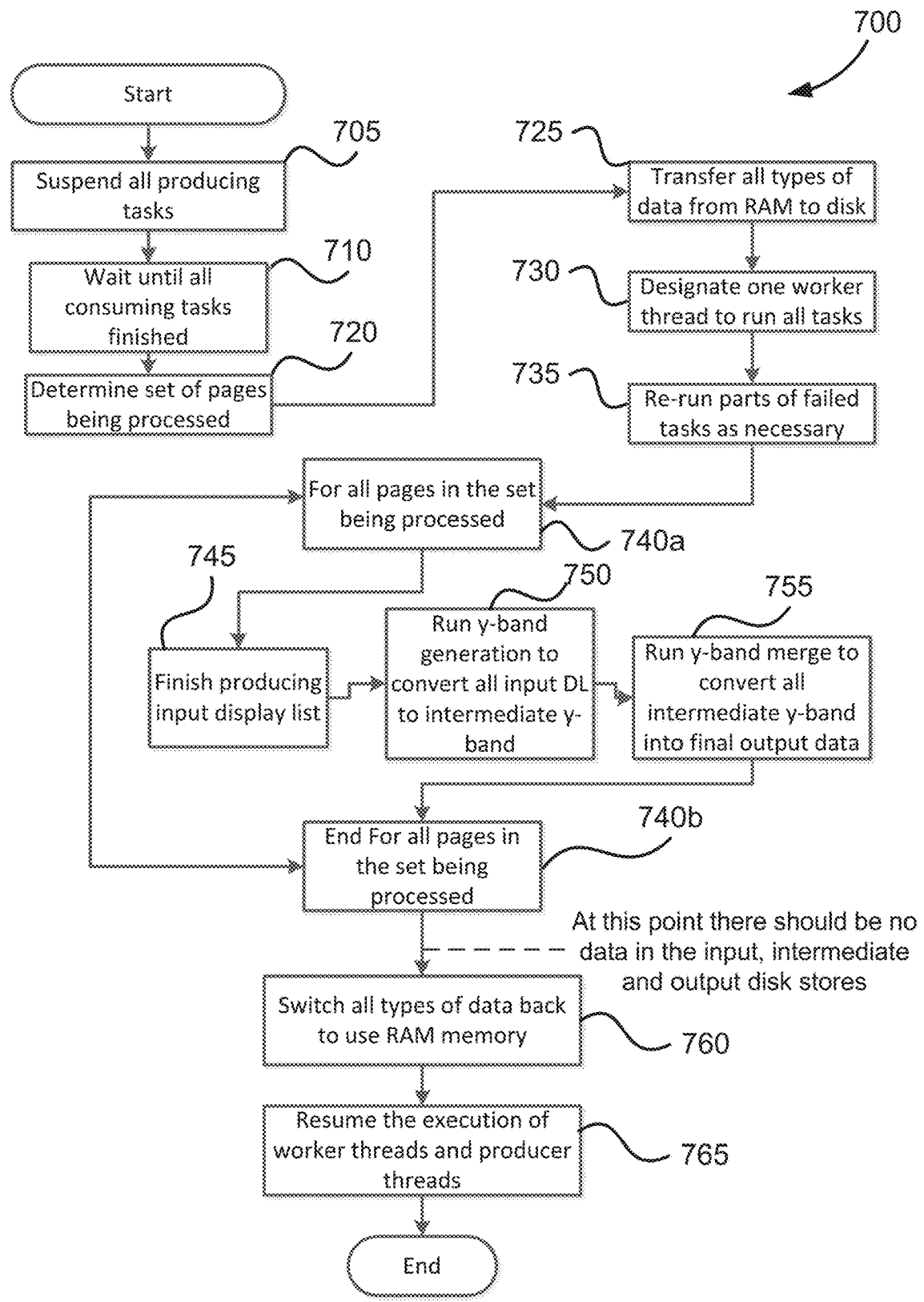
FIG. 7 is a flowchart showing a method of recovering from a failure in one or more consuming tasks.

A method 700 of recovering from a failure in one or more consuming tasks will now be described with reference to FIG. 7. The method 700 is performed by the scheduler 450. In the method 700 of FIG. 7, scheduler 450 performs scheduling actions when one or more consuming tasks fail due to memory allocation failure. The failure may be due to failure of sufficient memory allocation: input memory, intermediate memory, output memory or working memory of each task. Failure to allocate any of the above-mentioned memory type triggers the execution of the method 700 of FIG. 7.

The method 700 may be implemented as one or more code modules of the software application program 133, resident on the hard disk drive 110 and being controlled in its execution by the processor 105.

In suspending step 705, all producing tasks, such as PDLi task 402 and DL task 403, are suspended. The reason for suspension is that more input data is undesirable when the available system memory is low.

Next, in waiting step 710, the scheduler 450, under execution of the processor 105, waits for all consuming tasks running on worker threads to finish. Some of these consuming tasks running on the worker threads may finish successfully, but some of the consuming tasks running on the worker threads may also fail due to the lack of available memory.

Next, in determining step 720, pages having associated consuming tasks under process are determined under execution of the processor 105. The subsequent tasks related to the set of pages determined in step 720 will then be run in sequential processing mode (single-threaded mode).

Next, in transferring step 725, all data associated with the worker (consuming) tasks and subsequent tasks of the pages determined at step 720 from input, intermediate and output types of memory, is transferred from RAM memory 106, to the hard disk 110. Since the transferred data is not affected by flattening or compression or other ways that would affect resolution or detail of the job, quality of the print job is maintained. In the process of steps 705 to 725, the RAM memory 106 occupied by the transferred data is freed. In one arrangement, the data freed up RAM memory 106 is then used along with hard disk 110 memory for steps 730 to 740*b*. The data transferred at step 725 is related to only the set of pages determined in step 720.

Next, in designating step 730, the producer threads and all worker threads are suspended (i.e.: no tasks can be assigned to the producer threads and worker threads), except for one designated worker thread. As a result of step 730, all tasks will be assigned to that single designated worker thread only. Selection of worker thread by the scheduler 450 may be done in several ways. In one arrangement, the worker thread that becomes available first is selected as the designated worker thread.

In re-running step 735, the failed tasks, as determined by the step 720, are re-run, either wholly or partially under execution of the processor 105. A failed task can be re-run partially, or completely. If partial data output by a task before failure can be reused, the task can be re-run partially, appending output of the re-run task to the re-used data. For example, a y-band generation task may have rasterised a portion of an associated y-band, consisting of a few scanlines and failed to allocate working memory for the next portion. However, before the failure, complete raster data describing the few scanlines have been saved in the store 532 in a consistent state, which means the data may be read by another task. Then, the partial output may be transferred to store 532*a*. When the failed task is re-run, the restarted task may resume rasterising of the missing next portion only. Otherwise, the failed task may leave output data of the failed task in an inconsistent state. For example, a y-band generation task may have failed in the middle of scanline processing and fails to write complete raster data describing few previous scanlines or only partial data is written and such partial data cannot be read back by another task. Failure of the y-band generation task may occur when for example, a memory allocation failure occurs during writing the output data. If the output data is left in an inconsistent state due to the failure of the y-band generation task, the output data is discarded and the failed task is re-run completely.

The loop 740*a*-740*b* next executes steps 745 through 755 for each page in the set of pages determined at step 720. Inside the loop 740*a*-740*b*, the first step is producing step 745, where the producing tasks are run to finish constructing the input display list (512) for that page if required. Then, at running step 750, the y-band generator is run to convert the input display list (512) to intermediate y-band data (532). Then in running step 755, y-band merge tasks (540-541) are run under execution of the processor 105 to merge the intermediate y-band data output in step 750, into the final output data (204) for a given page. Step 755 concludes the execution of the loop 740*a*-740*b* iteration on a given page.

After the loop 740*a*-740*b* is executed for all pages in the set of pages determined at step 720, control moves to switching step 760. After the loop 740*a*-740*b* is executed for all pages in the set of pages determined at step 720 all data in the input, intermediate and output disk stores have been processed, so the hard disk 110 stores will now be empty. At switching step 760, the method 700 switches back to use RAM memory 106 for all types of stores (512, 532, 204) in future processing.

Finally, at resuming step 765, the normal execution of producer threads and worker threads is resumed (as shown at timestamp 970 of FIG. 9) before the next pages are processed. Step 765 concludes the recovery from the memory fault.

Figure 8:
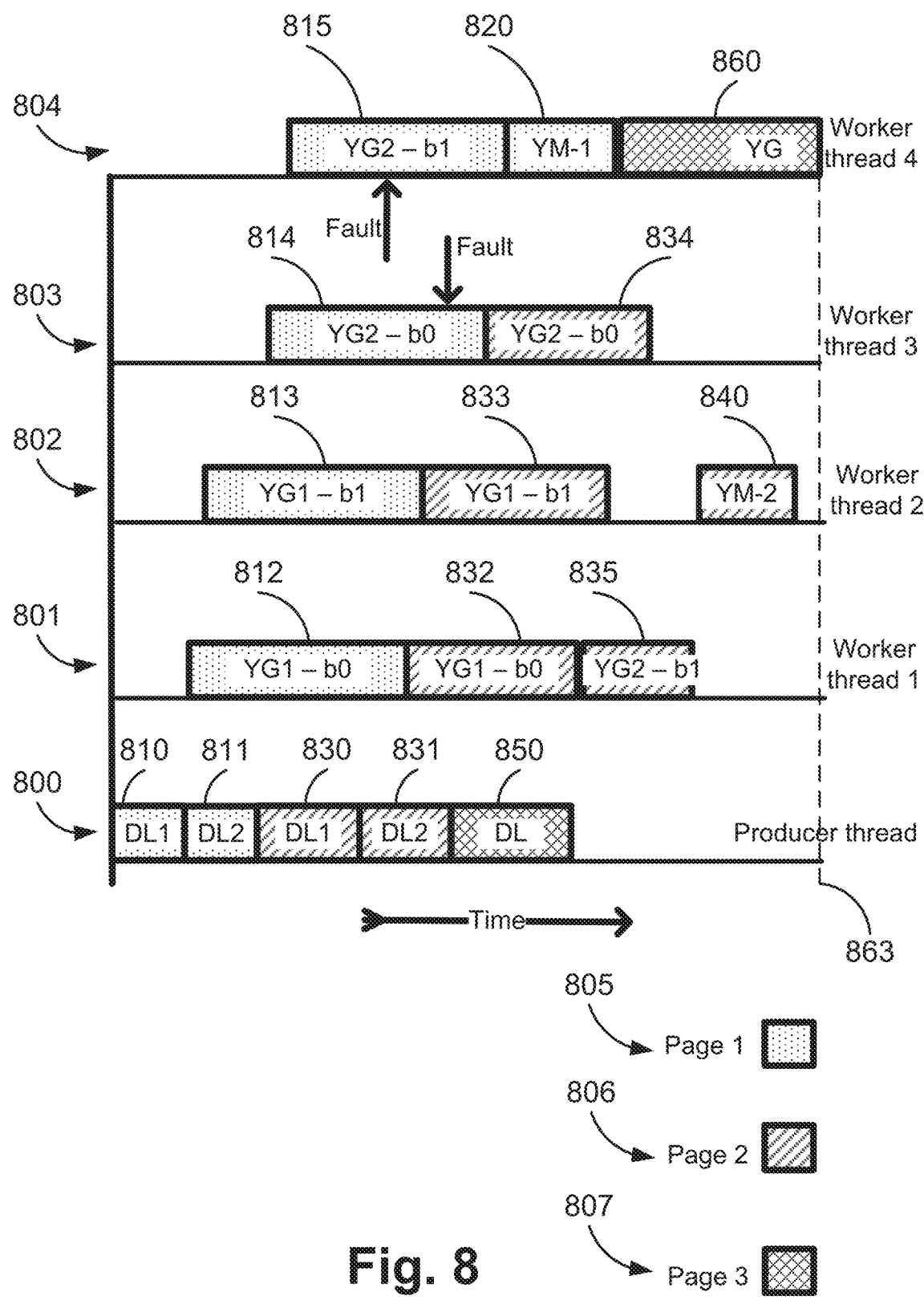
FIG. 8 is a timing diagram of tasks rasterising an example multi-page job, where pages are split into z-layers and y-bands.

A timing diagram for an example job being processed by the builder 203 of FIG. 5, in a multi-threaded environment will now be described according to FIG. 8. In the example of FIG. 8, one producer thread 800 and four worker threads 801 through 804, are used. Producer threads run the producing tasks of interpreting an input PDL job (PDL interpreter tasks) and producing a series of display lists for each page for the input PDL job (display list generation tasks). Worker threads run the consuming tasks that process the display lists and handle y-band generation tasks as well as y-band layer merge tasks.

There are three pages in the example job of FIG. 8. The three pages of the example job are Page 1 (805), with corresponding tasks marked as dotted boxes, Page 2 (806), with corresponding tasks marked as dashed boxes, and Page 3 (807), with corresponding tasks marked as cross-hatched boxes.

The processing of the example job starts from Page 1 (805), with producing task 810 generating the first layer of display list (DL1). The display list layer DL1 is split spatially into two y-bands b0 and b1, that are processed by corresponding tasks 812 and 813, designated YG1-b0 and YG1-b1. Scheduler 450 assigns worker threads 1 and 2 to execute the tasks YG1-b0 and YG1-b1, respectively.

Next, producing task 811 generates the second layer of display list (DL2). Likewise, the display list layer DL2 is split spatially into two bands b0 and b1, that are processed by corresponding tasks 814 and 815, designated. YG2-b0 and YG2-b1. Scheduler 450 assigns worker threads 3 and 4 to execute the tasks YG2-b0 and YG2-b1, respectively.

Next, producing tasks 830 and 831 generate the first and second layer of display list (DL1 & DL2), respectively, for Page 2 (806). However, the scheduler 450 cannot immediately schedule a y-hand gen task to process the layers as all worker threads are busy. Tasks processing the first and second band of DL1 (i.e., 832 and 833, respectively) and tasks processing the first and second band of DL2 (i.e., 834 and 835, respectively) are scheduled on worker threads 801, 802 and 803 when these worker threads become free after finishing the previous y-band generation tasks of the worker threads.

Meanwhile, worker thread 804 is assigned the task YM-1 of merging the intermediate results of Page 1 (task 820). The task of merging the intermediate results of Page 2 (806) must wait until all y-band generation (YG) tasks for Page 2 finish. When all y-band generation (YG) tasks for Page 2 are finished, a merging task YM-2 840 is started and assigned to worker thread 802.

The producing task 850 generates a single layer of display list (DL) for the final Page 3 (807) of the job. The y-band generation task (YG) for that layer (860) must wait until one of the worker threads become free, in this case thread 804. No intermediate layer merging may need to be executed for Page 3 (807) if only one y-band generation task is run for Page 3 (807).

The example of FIG. 8 is an example of a raster image processor (RIP) job which is complex enough, that processing of some pages requires splitting into z-layers and y-hands and running multiple y-band generation and y-band layer merge tasks. Typically, a y-band generation task and y-band merge task take longer time than producing the display list. As a result, producing tasks produce display lists faster than worker threads are able to consume the display lists on a limited number of computational resources (e.g., four worker threads), requiring consuming tasks to wait to be scheduled for execution at a later time.

The example in FIG. 8 runs all tasks without failure. The whole job has been processed at the time point 863 when data of all pages have been merged.

Figure 9:
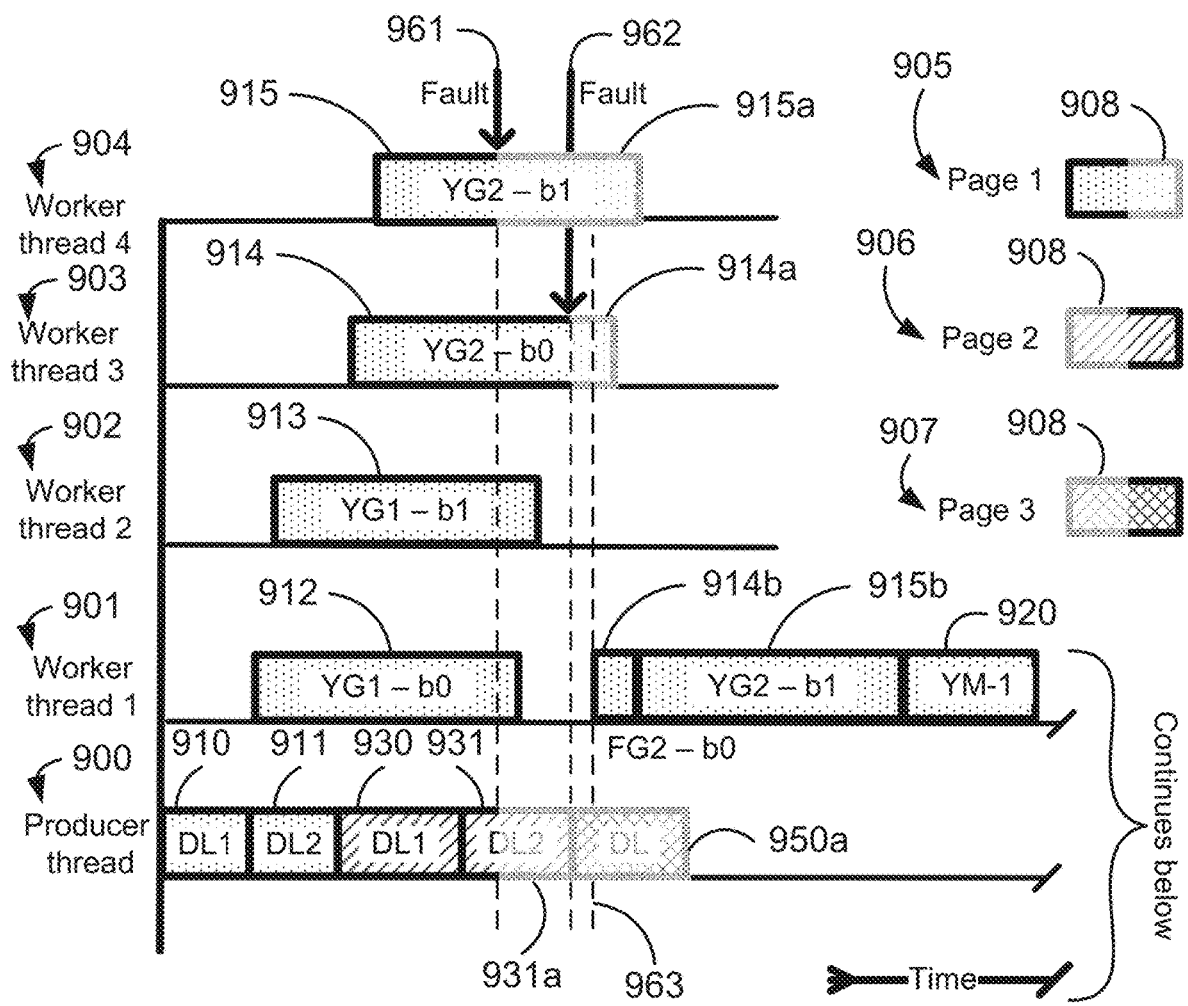
FIG. 9 is a timing diagram of tasks of FIG. 8, when some tasks failed, and the order of execution of all tasks has changed.
Figure 9:
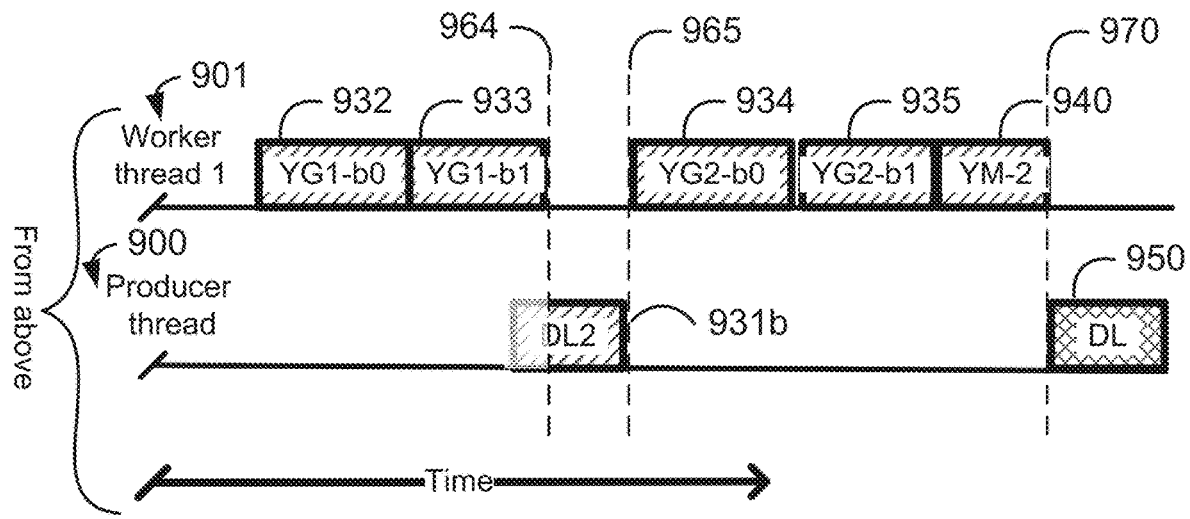

FIG. 9 shows a processing timing diagram for the same example job of FIG. 8. In the example of FIG. 9, the job is being processed by the builder 203 of FIG. 5, in a multi-threaded environment, but with a switch to single threaded mode as a result of a memory allocation failure. As described below, data associated with one or more failed tasks is processed by switching from a multi-threaded mode to a single threaded mode using memory freed in response to completion of processing of one or more remaining tasks.

In the example of FIG. 9, the job comprises the same three (3) pages 905, 906 and 907. As in the example of FIG. 8, the tasks for the pages are similarly marked with dotted, dashed and cross-hatched rectangles, respectively. However, execution of some tasks do not finish due to failure or suspension of tasks by scheduler 450. In the example of FIG. 8, after resuming from failure, some tasks do not need to be re-run from the start but start from where the consistent state ends. Such parts of a task for each page (e.g., 908) are marked greyed out in FIG. 9.

The same system configuration of one producer thread (900) and four worker threads 901 through 904 is used in the example of FIG. 9. The job processing results in the same split of display lists of two layers for Pages 1 and 2 (produced by tasks 910 and 911 for Page 1, then 9:30 and 931 for Page 2 respectively).

The y-band generation tasks of first layer (DU) of Page 1 for y-bands YG1-b0 and YG1-b1 (912 and 913 respectively) execute without failure. However, a memory allocation failure occurs in the y-band generation task for the second band of the second layer YG2-b1 915 at timepoint 961. The failure occurs when producer thread 900 has already produced the first layer for Page 2 (task 930) and has started producing the next layer (task 931).

Accordingly, the scheduler 450 switches the execution to recovery mode and suspends execution of producer thread 900. As a result, part 931a of task 931 is not executed, and the producing task for the third. Page 950a is not executed.

While waiting for all consuming tasks to finish, the tasks 912 and 913 finish successfully using the primary memory (i.e., RAM memory 106, cache memory etc). However, in the example of FIG. 9 the y-band generation task for the second layer 914 also encounters a memory allocation failure at timepoint 962. So, at timepoint 962, there are two failed tasks 914 and 915, the failed task parts being marked 914a and 915a respectively in FIG. 9.

At timepoint 962, scheduler 450 initiates transfer of all data in from RAM stores (512, 532, 204) to secondary memory stores (512a, 532a, 204a) for hard disk stores, for example. As described above, the primary memory (i.e., RAM memory 106, cache memory etc) typically has different characteristics to the secondary memory (i.e., hard disk memory 110). For example, the primary memory may have less storage capacity and faster storage speeds (e.g., read/write) than the secondary memory. The second memory may have limited read/write storage speeds but a higher storage capability than the primary memory.

Transferred data includes all intermediate data generated by tasks for Page 1, DL data for Page 1 that needs to be used by y-band generation tasks to be re-run (specifically second layer DL2 911) and DL data for Page 2 (layers DL1 930 and DL2 931) for which producer threads have been executed. There is no data for Page 3 to be transferred as producing tasks for Page 3 has not started yet. The transfer of the data in the RAM stores (512, 532, 204) finishes at the timepoint 963, at which time the serial execution of all tasks required to process the transferred data can start.

Next, the scheduler 450 determines that data of Pages 1 and 2 are present in the hard disk stores 512a, 532a, 204a. All tasks needed to process Page 1, then Page 2, are run sequentially on a designated thread. In the example of FIG. 9, the scheduler 450 designates worker thread 901 to run the tasks.

For page 1, there is no producing task to be run as producer 900 has generated all layers DL1 910 and DL2 911. Failed y-band generation tasks then need to be re-run. In the example of FIG. 9, the intermediate y-band data for failed task YG2-b0 914 output is in a consistent state, hence only the portion that failed to execute (914a) needs to be re-run. The portion 914a is re-run as task 914b. On the other hand, task 915 did not output associated intermediate y-band data, or output associated data in an inconsistent state, so the data is not transferred to hard disk store 532a. Therefore, task 915 is completely re-run as task 915b. After all y-band generation tasks have been successfully re-run, there is no more DL data for Page 1 in the display list store on the hard disk 110, so the merging task YM-1 920 is created. Task YM-1 920 merges all intermediate layer data into final data in store 204a which is sent to the renderer 205 and the recovery processing of Page 1 concludes.

For Page 2, there was no consuming task failure, but there exists DL data for Page 2 (layers DL1 and DL2) for which producer threads have been executed. The DL data for Page 2 for which producer threads have been executed needs to be processed. First, two y-band generation tasks are executed for the finished part of display list (layer DL1 930) that process band 0 (YG1-b0 932) and band 1 (YG1-b1 933) of DL1, respectively. Then, unfinished layer DL2 931a needs to be finished. To finish layer DL2 931a, the scheduler 450 resumes producer thread 900 at timepoint 964, at the same time worker thread 901 becomes idle according to the sequential execution in recovery mode. Producer thread finishes production of layer DL2 in task 931b at timepoint 965. At the same time, worker thread 901 starts running two new y-band generation tasks (YG2-b0 934 and YG2-b1 935) to process the first and second band of said DL2 layer of Page 2, respectively. Finally, y-band layer merge task YM-2 940 is executed to produce the final data in store 204a. The final data is sent to the renderer 205 and the recovery processing of Page 2 concludes.

At timepoint 970, all pages affected by the recovery have finished processing; so the processing can switch to normal multi-threaded mode. All worker threads are resumed, storage is switched back to use RAM memory 106 and Producer thread 900 is started with task 950 processing the next Page 3. The subsequent tasks (not shown) may be assigned and executed in multi-threaded mode.

INDUSTRIAL APPLICABILITY

The arrangements described are applicable to the computer and data processing industries and particularly for the parallelised rendering of images and documents for printing.

The foregoing describes only some embodiments of the present invention, and modifications and/or changes can be made thereto without departing from the scope and spirit of the invention, the embodiments being illustrative and not restrictive.

The invention claimed is:

1. A method of rendering pages in a graphics rendering system operating in a multi-threaded mode, the method comprising:

receiving a plurality of pages to be rendered in the graphics rendering system, each of the plurality of pages having associated producing tasks producing a sequence of graphic objects and consuming tasks consuming the sequence of graphic objects;

suspending, in a case where one or more failed consuming tasks from the associated consuming tasks are identified as a result of memory allocation failure, generation of further producing tasks in the multi-threaded mode;

processing data associated with the identified one or more failed consuming tasks upon switching from the multi-threaded mode to a single threaded mode after completion of processing of one or more of the remaining plurality of consuming tasks in the multi-threaded mode and completion of transferring data associated with the identified one or more failed consuming tasks from a primary memory to a secondary memory;

rendering one or more of the plurality of pages associated with the processed data; and reverting to multi-threaded mode upon completion of the data processing and resuming the associated producing tasks.

2. The method according to claim 1, wherein upon identifying one or more failed consuming tasks, transferring data associated with the identified one or more failed consuming tasks from the primary memory to the secondary memory, the secondary memory having characteristics different from primary memory characteristics.

3. The method according to claim 1, wherein the secondary memory used during processing of remaining consuming tasks is freed up upon completion of processing.

4. The method according to claim 1, wherein following tasks generated by failed tasks are also processed in single threaded mode in the secondary memory.

5. The method according to claim 1, wherein remaining tasks on a page having one or more failed tasks are also processed in single threaded mode for rendering.

6. The method according to claim 1, wherein in a case where one or more failed consuming tasks are identified, transferring data associated with the identified one or more failed consuming tasks from the primary memory to the secondary memory, the secondary memory having characteristics different from the primary memory characteristics, and wherein the secondary memory is a disk memory.

7. The method according to claim 1, wherein the identified one or more consuming tasks is re-run at least partially depending on the state of output generated by the identified one or more failed consuming tasks.

8. An apparatus for rendering pages in a graphics rendering system operating in a multi-threaded mode, the apparatus comprising:
a memory for storing data and a computer program;
a processor coupled to the memory for executing the program, the program comprising instructions for:

receiving a plurality of pages to be rendered in the graphics rendering system, each of the plurality of pages having associated producing tasks producing a sequence of graphic objects and consuming tasks consuming the sequence of graphic objects;

suspending, in a case where one or more failed consuming tasks from the associated consuming tasks are identified as a result of memory allocation failure, generation of further producing tasks in the multi-threaded mode;

processing data associated with the identified one or more failed consuming tasks upon switching from the multi-threaded mode to a single threaded mode after completion of processing of one or more of the remaining plurality of consuming tasks in the multi-threaded mode and completion of transferring data associated with the identified one or more failed consuming tasks from a primary memory to a secondary memory;

rendering one or more of the plurality of pages associated with the processed data; and reverting to multi-threaded mode upon completion of the data processing and resuming the associated producing tasks.

9. A non-transitory computer readable medium having stored thereon a computer program for rendering pages in a graphics rendering system operating in a multi-threaded mode, the program comprising:

code for receiving a plurality of pages to be rendered in the graphics rendering system, each of the plurality of pages having associated producing tasks producing a sequence of graphic objects and consuming tasks consuming the sequence of graphic objects;

code for suspending, in a case where one or more failed consuming tasks from the associated consuming tasks are identified as a result of memory allocation failure, generation of further producing tasks in the multi-threaded mode;

code for processing data associated with the identified one or more failed consuming tasks upon switching from the multi-threaded mode to a single threaded mode after completion of processing of one or more of the remaining plurality of consuming tasks in the multi-threaded mode and completion of transferring data associated with the identified one or more failed consuming tasks from a primary memory to a secondary memory;

code for rendering one or more of the plurality of pages associated with the processed data; and code for reverting to multi-threaded mode upon completion of the data processing and resuming the associated producing tasks.

* * * * *